April 23, 1963    J. A. K. RICHARDS    3,087,153
GATED PULSE RADAR SYSTEM
Filed June 8, 1956
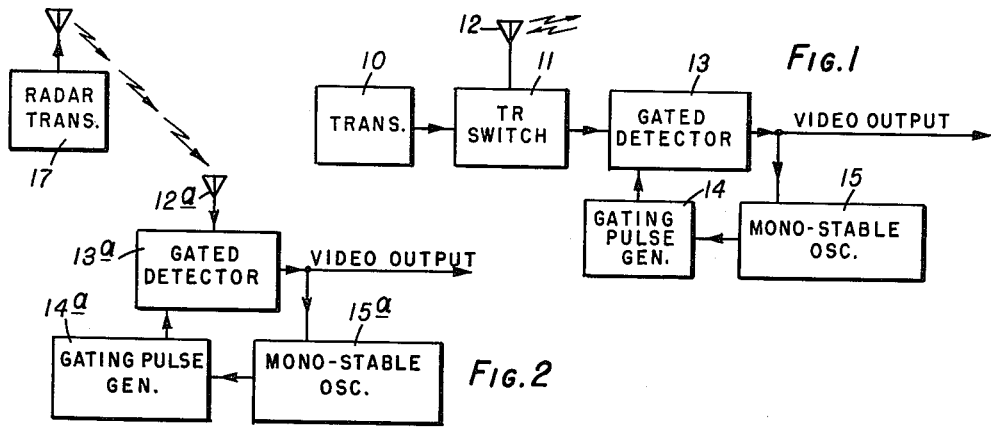
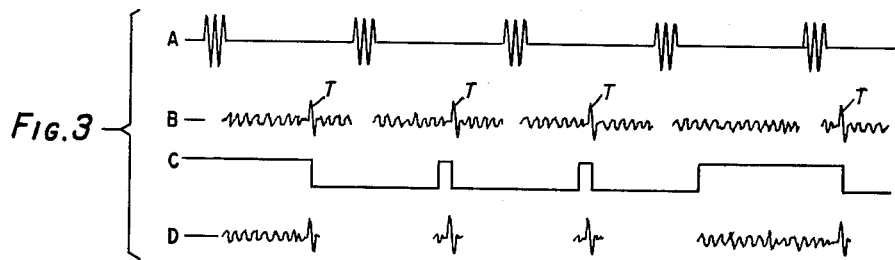
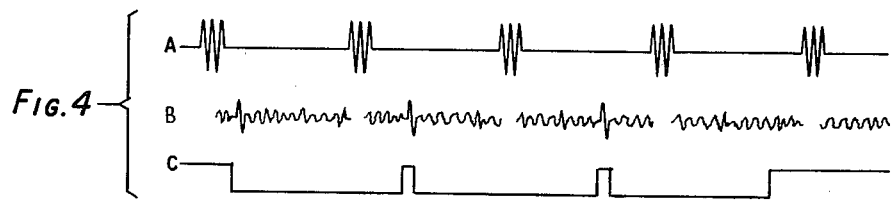
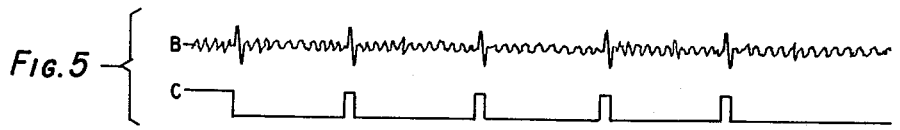
INVENTOR.
J.A.K. Richards
BY
ATTORNEY

United States Patent Office 3,087,153
Patented Apr. 23, 1963

3,087,153
GATED PULSE RADAR SYSTEM
James A. K. Richards, Van Nuys, Calif., assignor to The Bendix Corporation, a corporation of Delaware
Filed June 8, 1956, Ser. No. 590,227
6 Claims. (Cl. 343—7.3)

This invention relates to pulse radar systems in which short microwave pulses are repeatedly transmitted at a constant repetition rate, and desired echo pulses resulting therefrom are selectively received to the exclusion of undesired pulses or noise occurring at a time different from that of the desired pulse by gating the receiver off except when the desired pulses are due to arrive.

An object of the invention is to provide a relatively simple gating system that automatically maintains synchronism with the desired signal despite gradual variations in the timing thereof within the repetition period.

Other more specific objects and features of the invention will appear from the description to follow.

It is old broadly to employ range gates for rendering a radar receiver receptive to echo pulses from a particular range and to exclude noise and pulses from other ranges. However, the systems in general use for this purpose are operated by the transmitted pulses; i.e., they respond to each transmitted pulse to gate the receiver open at a later time when the echo from the desired target is due to arrive. As the range of the target changes, the time period of the gate-controlled circuit must be appropriately altered, else the signal will be lost; this involves rather complicated correction circuits and apparatus.

It is also old to make a receiver weakly receptive at all times but increase its sensitivity over the time period during which signal pulses may be received. In such systems, a local, continuously-running oscillator such as a free-running multivibrator varies the sensitivity of the receiver and is synchronized by incoming pulses to operate at the pulse repetition frequency. However, in such a system the local oscillator runs continuously, and if reception of the desired signal is temporarily interrupted for any reason, such as fading, the local oscillator may drift out of phase and thereby prevent reception of the desired pulses when they reappear.

The present invention is a receiving circuit adapted to be gated between open and closed conditions (in which it is receptive and nonreceptive, respectively) by a mono-stable multivibrator or blocking oscillator having a stable condition in which it gates the receiving circuit open and an unstable condition of fixed duration in which it gates the receiver circuit closed. The oscillator is triggered from stable to unstable condition by detected signals, and the duration of the unstable condition is slightly less than the repetition period of the pulses to be received.

The system is, therefore, normally receptive to receive and detect signals, but is rendered nonreceptive by a received pulse for approximately the repetition period, after which it is automatically rendered receptive in time to receive the next pulse. As long as pulses are received, the receiver is automatically gated on just before the pulse arrives and gated off again by the received pulse. If the desired signal fades out, the receiver remains in gated "on" condition until a signal is received.

A full understanding of the invention may be had from the following detailed description with reference to the drawing, in which:

FIG. 1 is a block diagram of a portion of an echo radar system incorporating the invention.

FIG. 2 is a block diagram of a portion of the receiving system incorporating the invention for receiving signals from a distant radar transmitter.

FIG. 3 is a set of graphs illustrating the operation of the system of FIG. 1.

FIG. 4 is a set of graphs illustrating the operation of the system of FIG. 2 under opening range conditions.

FIG. 5 is a set of graphs illustrating the operation of the system of FIG. 2 under closing range conditions.

Referring to FIG. 1, there are shown the elements of a pulse radar set in accordance with the invention for range-tracking an object (hereinafter referred to as a target) by transmitting radar pulses and receiving echo pulses reflected from the target. The set includes a conventional transmitter 10 which transmits pulses of microwave energy at a fixed repetition rate through a transmit-receive switch 11 to antenna 12 from which the pulses are radiated. Also connected to the antenna through the transmit-receive switch 11 is a gated detector 13 for receiving signals during the intervals between the transmitted pulses. The video output of the detector 13 is used in conventional ways to produce a desired indication. The gated detector 13 is normally in open (receptive) condition for the reception of signals, but it can be gated closed (nonreceptive to signals) by application thereto of a gating pulse from a gating pulse generator 14, which gating pulse generator is controlled by a mono-stable oscillator 15 which is connected to the output of the detector 13 and is triggered from its stable to its unstable condition in response to a pulse from the detector.

Although the elements described have not been used in the particular combination here shown for operation in the manner to be described, the elements are all individually well known and understood in the art. Thus, the transmitter 10 may be a magnetron oscillator or any other type of known radar oscillator. Transmit-receive switches, such as the switch 11, are commonly used in the art and function in response to a pulse from the transmitter 10 to connect the latter to the antenna 12 and disconnect the detector 13 from the antenna. At all other times, the switch 11 connects the antenna 12 to the detector 13. In some radar systems, it is desired that a small amount of the transmitted energy pass through switch 11 to the detector 13. However, in the present system this is not desired, and the transmit-receive switch 11 should be of a type or supplemented by apparatus that completely blocks any transfer of energy from the transmitter 10 directly to the detector 13, or prevents stimulation of the mono-stable multivibrator.

The gated detector 13 may include an IF amplifier and local oscillator and mixer in accordance with standard practice, but the essential feature of it is that it be capable of being gated open or closed. Such gating is commonly accomplished by impressing a blocking bias on one or more tubes in the detector to gate it off and apply another appropriate bias to gate it "on" (render it operative).

The mono-stable oscillator 15 may be a multivibrator or a blocking oscillator, both of which types are well known in the art. The only essential of the oscillator 15 is that it have a stable condition of indefinite duration, an unstable condition of fixed duration, and be capable of being triggered from its stable to its unstable condition by a pulse received from the detector 13. The gating pulse generator 14 may be simply an amplifier to increase the strength of a pulse delivered by the mono-stable oscillator 15 in one condition of operation, or it may incorporate a delay apparatus for producing a suitable delay between the issuance of a pulse from the detector 13 and the application of the gating pulse thereto.

Referring now to FIG. 3, curve A represents the timed pulses applied from the transmitter 10 to the antenna 12 through the transmit-receive switch 11. The fixed time period between successive pulses will hereinafter be referred to as the repetition period.

Curve B represents received signals received on the antenna 12 and passed through the switch 11 to the receiver 13. Curve B shows random noise and/or undesired echoes and a desired echo T from a desired target. In the particular example taken, the range is closing, so that each succeeding echo T is closer to the transmitted pulse that caused it.

Curve C shows the gating of the detector 13, the high portions of the line signifying that the gate is open and the lower portions that it is closed.

Curve D shows the portions of the complete signal shown in curve B that are passed by the detector 13.

Initially, as shown by curve C, the detector 13 is gated on, so that it detects all pulses applied thereto. Referring to curve B, it will be observed that no signals are applied to the detector during the transmission of a pulse (curve A). However, immediately thereafter, noise and signals from various sources are received and are passed by the open detector as shown in curve D and applied to the mono-stable oscillator 15. The oscillator 15 is adjusted to be triggered from its stable to its unstable state by an input signal of predetermined magnitude exceeding the prevalent noise. Such a signal is the signal T in curve B. This echo pulse passes through the detector, as shown by curve D, and triggers the oscillator 15 into its unstable condition, thereby applying a pulse to the gating pulse generator 14, which is amplified or otherwise modified and applied to the detector 13 to gate it closed, as indicated by the curve C in FIG. 3. The detector remains gated closed for a predetermined interval represented by the lower portion of curve C, after which the oscillator 15 automatically flips to its stable condition, again rendering the detector 13 receptive.

It will be apparent that in curve B the time between successive echo pulses T, T, T will be constant and equal to the repetition period of the transmitter if the target has no movement toward or away from the radar set. On the other hand, if the range is closing (i.e., the target is approaching the radar set), the period between the echo pulses T, T, T will be less than the repetition period, and contrariwise, if the range is opening, the spacing between the pulses T, T, T will be greater than the repetition period.

The duration of the unstable condition of the oscillator 15 is chosen according to the conditions of operation. If the radar set must be receptive to closing targets, the period of the unstable condition of the oscillator 15 must be less than the repetition period, and such a condition is shown in curve C. It is to be noted, however, that the use of a blanking period shorter than the repetition period does not preclude the reception of echoes from an opening target, because when it is once gated open, the detector remains open until it is gated off by a received signal. Of course, there is a loss of selectivity as to interference and undesired signals if the gate is opened sooner than necessary to pass the desired echo. Generally the period chosen would be sufficiently less than the repetition period to permit operation at the maximum rate of closure.

If an echo fails to appear, as shown near the right end of curve B in FIG. 3, the gate remains open to receive all signals coming in until a signal is received of sufficient strength to trigger the oscillator 15 into unstable condition. In FIG. 3, this signal is a subsequent echo signal T which occurs in the next period following the one in which no signal was received.

There are applications of radar in which a receiver receives pulses directly from a distant radar transmitter instead of receiving echoes from a local transmitter. The present invention is well suited to such systems. As shown in FIG. 2, a receiver for such use contains the elements 12a, 13a, 14a and 15a corresponding respectively to elements 12, 13, 14 and 15 of FIG. 1. However, there is no local transmitter, and signals are received from a distant transmitter 17. The transmitter 17 may be stationary, and the receiver may be moving toward or away from the transmitter; or vice versa, the receiver may be stationary, and the transmitter 17 may be moving toward or away from the receiver.

Referring to FIG. 4, the curves show the operation when the range between the transmitter and receiver is increasing. Curve A shows the transmitted pulses having a constant repetition period. Curve B shows the pulses received, which occur at a constant repetition rate that is greater than that of the transmitted pulses by virtue of the Doppler effect. The detector is normally receptive, as shown by the first part of curve C, but is gated off in response to the first signal pulse in curve B and remains off for a period greater than the repetition period of the transmitted pulses in curve A. In other words, in this particular instance, the apparatus is designed to give maximum selectivity for a condition in which the range is opening at a predetermined rate. If the range were opening less rapidly, or closing, the signals would not be received at all. When the gate opens just before the time when the signals are due to arrive, the maximum freedom from interfering signals is obtained.

It is to be understood that in the system of FIG. 1 the gate-closed period may also be longer than the repetition period of the transmitted pulses (FIG. 3A) when the desired echo is from an opening target, and thereby provide better discrimination against noise and undesired echoes.

FIGS. 3 and 4 show that by adjusting the length of the gate-closed period to be slightly less than the interval between pulses of a desired received signal, undesired signals arriving at other intervals will be excluded while the receiver remains locked on the desired signal, because the gate is closed except at the time of reception of the desired signal. Of course, when the apparatus is started, the gate is open and will close in response to the first pulse of any signal that is received. If this signal is an undesired one having a shorter period between pulses than the gate-closed period, the next pulse of the undesired signal will arrive while the gate is closed and will be rejected. However, the gate will open in time to receive the next pulse of the desired signal, and will lock on it.

In FIG. 5, curves B and C show the condition (in the system of FIG. 2) where the mono-stable oscillator 15a is adjusted to have an unstable period substantially shorter than the repetition rate of the transmitted signals (FIG. 4) so as to be capable of receiving signals when the range is closing. When the rate at which the range closes is known, the oscillator 15a can be accurately adjusted to fit it, so that the gate is open only at the time when the signal is due.

When the rate of closing or opening of the range is not known, then the unstable period of the oscillator must be chosen short enough to receive signals at the maximum rate of closing of the range. Under these conditions, it is necessary to sacrifice selectivity when the range is not closing rapidly, or is opening.

Although for the purpose of explaining the invention a particular embodiment thereof has been shown and described, obvious modifications will occur to a person skilled in the art, and I do not desire to be limited to the exact details shown and described.

I claim:

1. A receiving system for selectively receiving pulse signals recurring repeatedly at approximately constant intervals much greater than the pulse duration comprising:
   gated signal-detecting means operative between an open condition in which it is effective to pass received signals and a closed condition in which it is ineffective to pass received signals;

gate-control means connected to said detecting means normally maintaining said detecting means in said open condition and responsive to signals passed by said detecting means to gate said detecting means to said closed condition, said gate-control means including timing means for restoring said detecting means to said open condition after a predetermined interval substantially the same as said constant interval of recurrence of said pulses;

whereby said detector is normally responsive to pass received signals until a signal is received and is thereupon rendered ineffective to pass received signals for said predetermined interval.

2. Apparatus according to claim 1 in which:

said timing means comprises a monostable oscillator triggered by detected signals in the output of the detecting means from its stable to its unstable condition and having an unstable period of constant duration equal to said predetermined interval.

3. Apparatus according to claim 1 including transmitting apparatus at the location of said receiving system for transmitting pulse signals at said constant intervals for reflection from a distant object back to said receiving system;

and means for preventing direct reception by said receiving system of said transmitted pulses at the time of their transmission whereby said detecting means is not gated to said closed condition by direct pulses from said transmitter.

4. A receiving system for selectively receiving pulse signals from an independent remote transmitter having a constant repetition period and a closing range with respect to said receiving system which comprises:

gated signal-detecting means operative between an open condition in which it is effective to pass received signals and a closed condition in which it is ineffective to pass received signals;

gate-control means connected to said detecting means normally maintaining said detecting means in said open condition and responsive to signals passed by said detecting means to gate said detecting means to said closed condition, said gate-control means including timing means for restoring said detecting means to said open condition after a predetermined interval that is less than the repetition interval of said transmitter by an amount corresponding to the Doppler shortening of said transmitting interval, whereby desired signals from said transmitter when said range is closing are selectively received during gate-open periods of said detecting means and passed, and extraneous signals not time-coincident with the desired signals are discriminated against.

5. A system comprising in combination:

receiving apparatus for selectively receiving pulse signals recurring repeatedly at approximately constant intervals much greater than the pulse duration including gated signal-detecting means operative between an open condition in which it is effective to pass received signals and a closed condition in which it is ineffective to pass received signals;

said receiving apparatus also including gate-control means connected to said detecting means normally maintaining said detecting means in said open condition and responsive to signals passed by said detecting means to gate said detecting means to said closed condition, said gate-control means including timing means for restoring said detecting means to said open condition after a predetermined interval substantially the same as said constant interval of recurrence of said pulses, whereby said detector is normally responsive to pass received signals until a signal is received and is thereupon rendered ineffective to pass received signals for said predetermined interval;

transmitting apparatus at the location of said receiving apparatus for transmitting signal pulses for reflection from distant targets back to said receiving apparatus;

means for preventing reception by said receiving system of said transmitted pulses at the time of transmission whereby said detecting means is not gated to closed condition in response to transmitted pulses;

said transmitting apparatus having a constant repetition interval slightly less than said predetermined interval whereby successive echo pulses from stationary and closing targets are received during gate-closed periods of said detecting means and thereby discriminated against, and successive echo pulses from opening targets having intervals greater than said transmitted intervals are received during gate-open periods and passed.

6. A receiving system for selectively receiving pulse signals from an independent remote transmitter having a constant repetition interval and an opening range with respect to said receiving apparatus;

said receiving system including gated signal-detecting means operative between an open condition in which it is effective to pass received signals and a closed condition in which it is ineffective to pass received signals;

gate-control means connected to said detecting means normally maintaining said detecting means in said open condition and responsive to signals passed by said detecting means to gate said detecting means to said closed condition, said gate-control means including timing means for restoring said detecting means to said open condition after a predetermined interval slightly greater than the repetition interval of said transmitter whereby signals received from said remote transmitter when said range is opening are passed by said detecting means, and other received signals of lesser repetition interval than said predetermined interval are blocked by said detecting means.

References Cited in the file of this patent

UNITED STATES PATENTS

| | | |
|---|---|---|
| 2,412,974 | Deloraine | Dec. 24, 1946 |
| 2,427,191 | Brink | Sept. 9, 1947 |
| 2,445,584 | Ramo | July 29, 1948 |
| 2,845,621 | Hasbrook | July 29, 1958 |

FOREIGN PATENTS

| | | |
|---|---|---|
| 133,807 | Australia | Aug. 8, 1949 |